June 24, 1969     M. L. A. PAULVE     3,452,325
ELECTRICAL CONNECTING DEVICE
Filed March 10, 1967
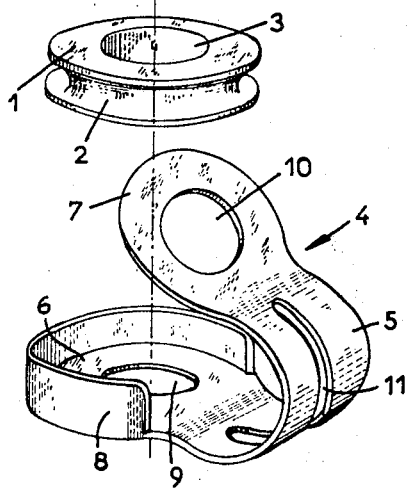
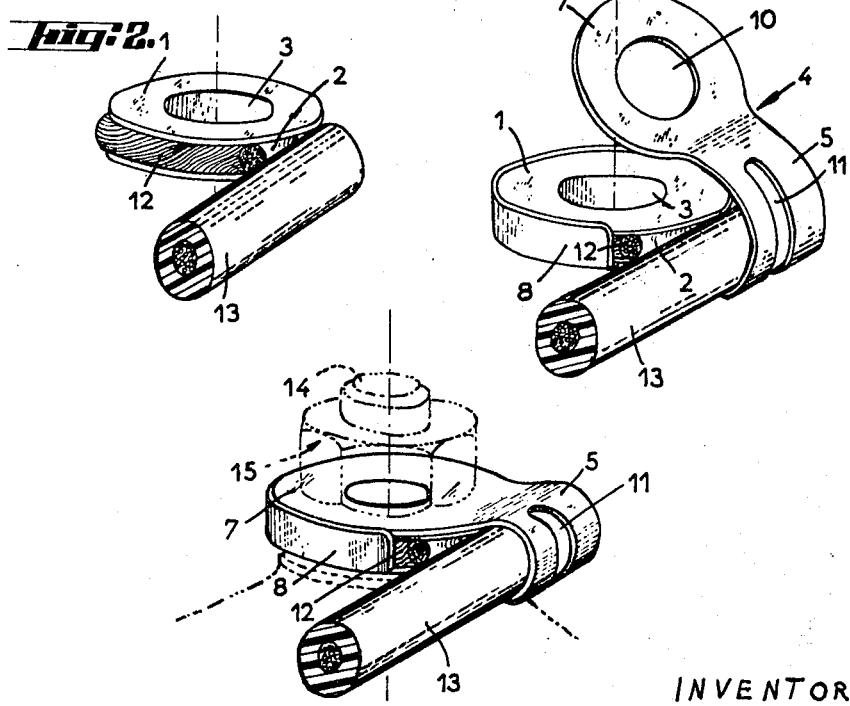
INVENTOR:
MARCEL LUC AMÉDÉ PAULVE
By: holte and holte
ATTORNEYS

United States Patent Office 3,452,325
Patented June 24, 1969

3,452,325
ELECTRICAL CONNECTING DEVICE
Marcel Luc Amédé Paulve, Le Muy, France, assignor to Societe d'Exploitation des Procedes Paulve, Cannes, France, a company of France
Filed Mar. 10, 1967, Ser. No. 622,301
Claims priority, application France, Mar. 11, 1966, 53,178
Int. Cl. H01r 7/16
U.S. Cl. 339—269                                              6 Claims

ABSTRACT OF THE DISCLOSURE

Electrical cable terminal connector forming a spade lug or tag comprising a thimble forming eye-ring provided with a peripheral groove to receive the bared lead wire end of a conductor cable wound thereabout and a U-shaped bent clip-on clasp with apertured flat ends one of which is flanged to form a cable socket or shoe for accommodating said thimble whereas the other end forms a cover to close said socket, whereby this assembly is adapted to be secured on a clamping screw terminal binding post extending through the aligned apertures of said thimble and clasp ends with a tightening not threaded thereon.

---

The present invention essentially relates to a device or appliance for electrically connecting a cable, in particular a cable provided with an insulating sheath, to a terminal or the like, provided with clamping or tightening means, for example to a terminal consisting of a threaded stud rod or screw therminal on which may be threaded a nut.

The strong vibrations to which are subject certain electrical apparatus result in a quick deterioration of their electrical connecting members. The stiffness or rigidity of the insulating sheath, casing or serving with respect to the metal conductor or lead wire and the lack of connection between such a sheath and the conductor result in view of the vibrations which are sustained by the apparatus, in repeated flexures and bendings of the wire which quickly cause its strain-hardening hence its breaking or rupture close to the terminal. These difficulties are in particular encountered in the stationary railway plants or installations the sub-structures of which are subject to strong vibrations, shocks and jerks owing to the passage of trains on the railway tracks with more and more increasing speeds.

An object of the device according to the present invention is to avoid this drawback and it is characterized in that it comprises an electrically conducting core element or the like, deformable under pressure and provided with a groove, a score or the like, adapted to receive the end of the cable and an electrically conducting fastener clip or clasp shaped member or the like, surrounding or encompassing the cable portion or area immediately adjacent to said end and provided with two lugs or the like, one of which includes a cup-like portion adapted to receive or to accommodate said core element, whereas the other is adapted to cap or cover said cup, so that when said device is fastened, secured or attached to said terminal and clamped or tightened by said clamping means, said clip or clasp tightly clamps or presses the cable portion which it encompasses while said core element, after its deformation, applies the cable end against the wall of the cup.

It is readily appreciated that the device according to the invention enables to make the insulating sheath, casing or serving of the cable integral with the terminal and that it further achieves a self-setting or crimping providing a good electrical contact or engagement between the lead wire and the cup itself electrically connected to the terminal on which the device is mounted.

According to another feature of the invention, said core element has substantially the shape of a circular pulley or sheave formed with a peripheral groove, score or slot.

According to still another feature of the invention, said clip-like member consists of a malleable metal strip, leaf, blade, tongue, web or like lamination, bent or folded back on itself so as to form a kind of hinge both ends of which are superposable.

Still according to the invention, said pulley, thimble or eye-ring as well as both ends of the clip or strap like part are formed in their central portions with recesses or apertures enabling to slip said device on said terminal.

It is seen in particular that the fastening or securing said device on the terminal is extremely simple since it is achieved by the clamping means of the terminal itself, these clamping means being for example a mere spade nut or screw bolt.

It may also be noted that such an attachment requires the use of no special tool or implement.

These and other objects, features and advantages of the invention will appear as the following description proceeds with reference to the accompanying diagrammatic drawings, given by way of example only and wherein:

FIGURE 1 is a perspective view of an embodiment of the device according to the invention, the core element and the clip-like member being assumed to be separated from each other;

FIGURE 2 is a perspective view of the core element on which is mounted the cable to be connected;

FIGURE 3 shows the device when the core element is positioned within the cup-like portion of the clip-shaped member, before mounting thereof on a terminal;

FIGURE 4 shows the device according to the invention after having been mounted on the terminal adapted to receive it.

According to the embodiment shown, the device according to the invention essentially comprises a core element 1, having the shape of a thimble or eye-ring in the form of a circular pulley or sheave provided on its periphery with a groove, score or slot 2 of half-round cross-section and in its central portion with an orifice or the like 3 of circular shape and coaxial with said pulley proper. This pulley is preferably made from a metal which is malleable enough so that a pressure exerted upon both of its sides or lateral faces in a direction parallel with its axis of revolution results in a crashing or collapsing of the lips or edges of the groove 2.

The device according to the invention also comprises a clip-like member 4 consisting of a flat strip of malleable metal 5 bent or folded back on itself in the shape of a strap or U and both ends 6 and 7 of which are enlarged or widened so as to form small plate portions or the like of a substantially circular shape, the diameter of which is slightly above that of the pulley or thimble 1. One of these small plate portions 6 is formed with an upstanding flange or up-turned edge 8 so as to provide a cup or socket adapted to receive the pulley or eye-ring 1. The other small plate portion 7, the diameter of which is substantially equal to that of the small plate portion 6, may be superposed to this latter so as to cover or to cap the cup. Both small plate portions 6 and 7 are formed, in their central portions, with circular orifices or holes 9 and 10 having substantially the same diameter than the orifice 3 of the pulley or thimble 1. The flat strip 5 comprises a medial slot or slit 11 extending almost over the whole length thereof.

After having stripped off or bared the end 12 of the cable 13 over a length slightly smaller than the outer circumferential contour of the pulley or eye-ring 1, this bared end is wound about said pulley or thimble while engaging or inserting it in the groove or score 2, the cable portion, which remains covered or shielded with insulated material being tangent to said pulley or thimble (see FIGURE 2). The pulley or thimble 1, thus connected to the lead wire, is then inserted into the cup or socket 8 so that the cable end, which is covered or shielded by the insulating material, be surrounded or encompassed by the flat strip 5 (see FIGURE 3). It then suffices to shut down the small plate portion 7 on the pulley or thimble 1 and to slip the device on the screw terminal 14 and to fasten it by means of the nut 15.

The tightening by the nut 15 by crashing the pulley or eye-ring 1 results in drawing the lips of the groove or score 2 near towards each other whereby they compress the portion 12 of the cable and drive it outwards, so that this board end of the cable is firmly applied against the wall 8 of the cup. At the same time, the insulated portion of the cable, which is encompassed by the small plate portion 5, is tightly clamped by the pressure exerted on the insulating material; moreover, this insulating material, which is deformable, partially enters the slot or slit 11 of the flat strip 5. It results therefrom that the cable is firmly connected to the terminal and therefor there is no flexure or bending between the insulated portion and the bared portion of the cable, whereby any braking hazards or risks are eliminated.

It is further seen that the mounting and disassembling of the device according to the invention is particularly simple since it suffices to screw up tightly or to unlock or to release the nut 15 by means of an ordinary spanner, that is without having to make use of a special tool.

It is understood that the invention should not be construed as being limited to the form of embodiment described and shown herein which has been given by way of example only, as many modifications and variations may be made by those skilled in or conversant in the art without departing from the gist and scope of the invention.

What I claim is:

1. A device for electrically connecting a cable, provided in particular with an insulating sheath and having at one end a non-insulated loop, to a terminal provided with clamping means, comprising an electrically conducting, pressure deformable, separate core element provided with a groove to receive said non-insulated loop and an electrically conducting clip like member comprising a flat strip provided for encompassing said insulating sheath in the area thereof which is immediately adjacent to said non-insulated loop and two superposable lug members, one of which is formed with a cup-like socket to accommodate said separate core element, whereas the other is adapted to cover said socket in closing relationship, so that when said device is secured to said terminal and tightly held by said clamping means, said clip like member firmly clamps the cable portion encompassed thereby while said core element applies through its deformation said cable end against the wall of said socket.

2. A device according to claim 1, wherein said core element has substantially the shape of a circular thimble-like eye-ring formed with a peripheral score having a substantially half-round cross-section, the diameter of which substantially corresponds to that of said non-insulated loop.

3. A device according to claim 2, wherein said thimble is made from a malleable metal.

4. A device according to claim 1, wherein said flat strip is formed with a central slot so that the portion of said insulating sheath encompassed by flat strip partially enters said slot whereby said cable is firmly connected to said terminal.

5. A device according to claim 1, wherein said lug members have substantially the shape of circular plate portions.

6. A device according to claim 1, wherein said core element and said lug members are provided, in their central portions, with an aperture, respectively, enabling to slip said device on said terminal.

References Cited

UNITED STATES PATENTS

| 1,542,074 | 6/1925 | Mayer | 339—249 X |
| 2,461,994 | 2/1949 | Merkel | 339—276 |
| 2,648,054 | 8/1953 | Berg | 339—276 |
| 3,181,110 | 4/1965 | Waters | 339—276 X |

FOREIGN PATENTS

| 118,983 | 10/1944 | Australia. |
| 725,881 | 2/1932 | France. |
| 15,091 | A.D.1911 | Great Britain. |

MARVIN A. CHAMPION, *Primary Examiner.*

JOSEPH H. McGLYNN, *Assistant Examiner.*

U.S. Cl. X.R.

339—271